(12) United States Patent
Macnaughton et al.

(10) Patent No.: US 8,037,169 B2
(45) Date of Patent: Oct. 11, 2011

(54) DETERMINING AFFINITY IN A CLUSTER

(75) Inventors: Neil James Scott Macnaughton, Los Gatos, CA (US); Sashikanth Chandrasekaran, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1367 days.

(21) Appl. No.: 11/132,807

(22) Filed: May 18, 2005

(65) Prior Publication Data

US 2006/0265420 A1 Nov. 23, 2006

(51) Int. Cl.
G06F 15/173 (2006.01)

(52) U.S. Cl. .. 709/224; 709/225; 709/226; 707/E17.007

(58) Field of Classification Search ................... 709/226, 709/224, 225; 707/202, 2, 8, E17.007
See application file for complete search history.

(56) References Cited

U.S. PATENT DOCUMENTS

| | | | |
|---|---|---|---|
| 4,633,387 A | 12/1986 | Hartung et al. | 364/200 |
| 4,809,157 A | 2/1989 | Eilert et al. | |
| 4,980,822 A | 12/1990 | Brantley et al. | 364/200 |
| 5,239,649 A | 8/1993 | McBride et al. | |
| 5,249,291 A | 9/1993 | Williams | |
| 5,283,897 A | 2/1994 | Georgiadis et al. | |
| 5,307,485 A | 4/1994 | Bordonaro | 395/600 |
| 5,325,525 A | 6/1994 | Shan et al. | 395/650 |
| 5,377,350 A | 12/1994 | Skinner | |
| 5,440,732 A | 8/1995 | Lomet et al. | |
| 5,592,671 A | 1/1997 | Hirayama et al. | 395/674 |
| 5,612,856 A | 3/1997 | Albach | 363/20 |
| 5,675,791 A | 10/1997 | Bhide et al. | 707/205 |
| 5,692,182 A | 11/1997 | Desai et al. | 707/2 |
| 5,761,512 A | 6/1998 | Breslau et al. | |
| 5,784,697 A | 7/1998 | Funk et al. | |
| 5,822,531 A | 10/1998 | Gorczyca et al. | |
| 5,848,408 A | 12/1998 | Jakobsson et al. | 707/3 |
| 5,870,743 A | 2/1999 | Cohen et al. | 707/8 |
| 5,892,945 A | 4/1999 | Mirchandaney et al. | 395/674 |
| 5,946,685 A | 8/1999 | Cramer et al. | |
| 5,956,704 A | 9/1999 | Gautam et al. | 707/1 |
| 5,964,838 A | 10/1999 | Cheung et al. | |
| 5,970,495 A | 10/1999 | Baru et al. | 707/102 |
| 6,003,036 A | 12/1999 | Martin | 707/102 |
| 6,023,702 A | 2/2000 | Leisten et al. | 707/100 |

(Continued)

OTHER PUBLICATIONS

European Patent Office, "Communication pursuant to Article 96(2) EPC," Dated Feb. 11, 2005 (Nov. 2, 2005), 6 pages.

(Continued)

*Primary Examiner* — Melanie Jagannathan
*Assistant Examiner* — Stephanie Chang
(74) *Attorney, Agent, or Firm* — Hickman Palermo Truong & Becker LLP

(57) ABSTRACT

A lock manager system is provided that includes multiple distinct mechanisms for assigning resources to masters. Specifically, the lock manager system includes (1) one or more assignment mechanisms that do not take into account the affinity between nodes and objects ("affinity-independent assignment mechanisms"), and (3) one or more assignment mechanisms that do take into account the affinity between nodes and objects ("affinity-based assignment mechanisms"). At any given time, the assignment of any given resource to a master is governed by only one of the multiple assignment mechanisms employed by the system. Various techniques are described for determining which assignment mechanism to use with which resources.

28 Claims, 3 Drawing Sheets

U.S. PATENT DOCUMENTS

| | | | |
|---|---|---|---|
| 6,058,389 A | 5/2000 | Chandra et al. | 707/1 |
| 6,069,705 A | 5/2000 | Suvarna | 358/1.13 |
| 6,081,900 A | 6/2000 | Subramaniam et al. | 713/201 |
| 6,092,062 A | 7/2000 | Lohman et al. | 707/2 |
| 6,108,654 A | 8/2000 | Chan et al. | 707/8 |
| 6,112,198 A | 8/2000 | Lohman et al. | 707/3 |
| 6,112,225 A | 8/2000 | Kraft et al. | 709/202 |
| 6,173,313 B1 | 1/2001 | Klots et al. | |
| 6,208,994 B1 | 3/2001 | Abdelnur | |
| 6,219,666 B1 | 4/2001 | Krishnaswamy et al. | |
| 6,223,182 B1 | 4/2001 | Agarwal et al. | 707/102 |
| 6,240,428 B1 | 5/2001 | Yeung et al. | 707/206 |
| 6,240,466 B1 | 5/2001 | McKeehan et al. | |
| 6,249,802 B1 | 6/2001 | Richardson et al. | |
| 6,253,273 B1 | 6/2001 | Blumenau | |
| 6,263,331 B1 | 7/2001 | Liu et al. | 707/4 |
| 6,272,491 B1 | 8/2001 | Chan et al. | 707/8 |
| 6,321,240 B1 | 11/2001 | Chilimbi et al. | |
| 6,324,563 B1 | 11/2001 | Hotea et al. | |
| 6,330,556 B1 | 12/2001 | Chilimbi et al. | |
| 6,345,267 B1 | 2/2002 | Lohman et al. | 707/2 |
| 6,345,288 B1 | 2/2002 | Reed et al. | |
| 6,385,613 B1 | 5/2002 | Grewell et al. | |
| 6,405,274 B1 | 6/2002 | Chan | |
| 6,424,992 B2 | 7/2002 | Devarakonda et al. | |
| 6,438,562 B1 | 8/2002 | Gupta et al. | 707/201 |
| 6,453,404 B1 | 9/2002 | Bereznyi et al. | |
| 6,505,227 B1 | 1/2003 | Mirchandaney et al. | 709/102 |
| 6,529,906 B1 | 3/2003 | Chan | |
| 6,549,931 B1 | 4/2003 | Amor et al. | |
| 6,618,851 B1 | 9/2003 | Zundel et al. | |
| 6,658,448 B1 | 12/2003 | Stefaniak et al. | |
| 6,735,613 B1 | 5/2004 | Jean-Dominique et al. | |
| 6,751,616 B1 | 6/2004 | Chan | |
| 6,826,753 B1 | 11/2004 | Dageville et al. | 718/102 |
| 6,920,454 B1* | 7/2005 | Chan | 707/8 |
| 7,080,075 B1* | 7/2006 | Chan et al. | 707/8 |
| 7,085,911 B2 | 8/2006 | Sachedina et al. | |
| 7,191,172 B2 | 3/2007 | McGrath et al. | |
| 7,203,748 B2 | 4/2007 | Hare et al. | |
| 7,246,120 B2 | 7/2007 | Chan et al. | |
| 7,328,263 B1* | 2/2008 | Sadjadi | 709/225 |
| 7,380,039 B2 | 5/2008 | Miloushev et al. | |
| 7,386,630 B2 | 6/2008 | Liong et al. | |
| 7,493,400 B2 | 2/2009 | Loaiza et al. | |
| 2002/0038301 A1* | 3/2002 | Aridor et al. | 707/10 |
| 2002/0040357 A1 | 4/2002 | Miller | |
| 2003/0023728 A1 | 1/2003 | Yaung | |
| 2003/0028550 A1 | 2/2003 | Lee et al. | |
| 2003/0036882 A1 | 2/2003 | Harper et al. | |
| 2003/0145020 A1* | 7/2003 | Ngo et al. | 707/201 |
| 2003/0149698 A1 | 8/2003 | Hoggatt | |
| 2004/0199919 A1 | 10/2004 | Tovinkere | |
| 2005/0149540 A1 | 7/2005 | Chan et al. | |
| 2005/0240553 A1 | 10/2005 | Diggs et al. | |
| 2006/0090139 A1 | 4/2006 | Jenni et al. | |
| 2006/0129634 A1 | 6/2006 | Khouzam et al. | |
| 2006/0143350 A1 | 6/2006 | Miloushev et al. | |
| 2006/0149731 A1 | 7/2006 | Schirmer et al. | |
| 2006/0212573 A1 | 9/2006 | Loaiza et al. | |
| 2006/0265414 A1 | 11/2006 | Loaiza et al. | |
| 2006/0265420 A1 | 11/2006 | Macnaughton et al. | |

OTHER PUBLICATIONS

Current Claims, EP 99 968 071.3, 8 pages.
U.S. Appl. No. 10/160,128, filed May 30, 2002, Office Action Mailing Date Mar. 15, 2006.
U.S. Appl. No. 11/282,327, filed Nov. 18, 2005.
Cheevers, Sandra, "Oracle 9i Database Summary, An Oracle White Paper," Oracle Corporation, May 2002, pp. 1-35.
Hansell, Daniela, "Managing Oracle9i Real Application Clusters, An Oracle White Paper," Oracle Corporation, Mar. 2001, 12 pages.
Oracle Corporation, "Oracle9i Real Application Clusters Administration," Release 1 (9.0.1), Part No. A89869-02, 1996-2001, Ch. 1-4, 9, 98 pages.
Oracle Corporation, "Oracle9i Real Application Clusters Installation and Configuration," Release 1 (9.0.1), Part No. A89868-02, 1996-2001, Ch. 4-5, 33 pages.
U.S. Appl. No. 10/832,527, filed Apr. 26, 2004, Office Action Mailing Date Apr. 19, 2007.
U.S. Appl. No. 11/000,818, filed Nov. 30, 2004, Office Action Mailing Date Apr. 19, 2007.
U.S. Appl. No. 11/418,782, filed May 5, 2006, Office Action Mailing Date May 2, 2007.
U.S. Appl. No. 10/091,618, filed Mar. 4, 2002, Office Action Mailing Date Jul. 7, 2005.
Bridge, W., "The Oracle Universal Server Buffer Manager," Proceedings of the 23$^{rd}$ VLDB Conference, Athens Greece, 1997, pp. 590-594.
Oracle Corporation, "Introducing Oracle Parallel Server," Oracle8i Parallel Server Setup and Configuration Guide, Release 8.1.5, Chapter 1, 1999, retrieved from the internet at <http://www.csee.umbc.edu/help/oracle8/server.815/a67439/chap1.htm>, retrieved on Nov. 4, 2005, 15 pages.
Oracle Corporation, "Overview of Locking Mechanisms," Oracle8i Parallel Server Concepts and Administration, Release 8.1.5, chapter 7, 1999, retrieved from the internet at <http://www.csee.umbc.edu/help/oracle8/server.815/a67778/ch7_lock.htm>, retrieved on Nov. 4, 2005, 12 pages.
Oracle Corporation, "Integrated Distributed Lock Manager," Oracle8i Parallel Server Concepts and Administration, Release 8.1.5, chapter 8, 1999, retrieved from the internet at <http://www.csee.umbc.edu/help/oracle8/server.815/a67778/ch8_lm.htm>, retrieved on Nov. 4, 2005, 8 pages.
U.S. Appl. No. 11/205,529, filed Aug. 16, 2005, Final Office Action, Mailing Date Oct. 27, 2009.
U.S. Appl. No. 11/205,529, filed Aug. 16, 2005, Interview Summary Mailing Date Dec. 1, 2009.
U.S. Appl. No. 11/205,529, filed Aug. 16, 2005, Notice of Allowance Mailing Date Jun. 10, 2010.

* cited by examiner

DETERMINING AFFINITY IN A CLUSTER

FIELD OF THE INVENTION

The present invention relates to multiple-node systems and, more specifically, establishing resource-to-master-node assignments based on the degree of affinity between resources and the objects to which resources belong.

BACKGROUND

Within the context of computer systems, many types of resources can be shared among processes. However, many resources, though sharable, may not be accessed in certain ways by more than one process at any given time. For example, resources such as data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that indicates that a particular process has been granted certain rights with respect to a resource. There are many types of locks. Some types of locks may be shared on the same resource by many processes, while other types of locks prevent any other locks from being granted on the same resource.

The entity responsible for granting locks on resources is referred to as a lock manager. In a single node database system, a lock manager will typically consist of one or more processes on the node. In a multiple-node system, such as a multi-processing machine or a local area network, a lock manager may include processes distributed over numerous nodes. A lock manager that includes components that reside on two or more nodes is referred to as a distributed lock manager.

FIG. 1 is a block diagram of a multiple-node computer system 100. Each node has stored therein a database server and a portion of a distributed lock management system 132. Specifically, the illustrated system includes three nodes 102, 112 and 122 on which reside database servers 104, 114 and 124, respectively, and lock manager units 106, 116 and 126, respectively. Database servers 104, 114 and 124 have access to the same database 120. The database 120 resides on a disk 118 that contains multiple blocks of data. Disk 118 generally represents one or more persistent storage devices which may be on any number of machines, including but not limited to the machines that contain nodes 102, 112 and 122.

A communication mechanism allows processes on nodes 102, 112, and 122 to communicate with each other and with the disks that contain portions of database 120. The specific communication mechanism between the nodes and disk 118 will vary based on the nature of system 100. For example, if the nodes 102, 112 and 122 correspond to workstations on a network, the communication mechanism will be different than if the nodes 102, 112 and 122 correspond to clusters of processors and memory within a multi-processing machine.

Before any of database servers 104, 114 and 124 can access a resource shared with the other database servers, it must obtain the appropriate lock on the resource from the distributed lock management system 132. Such a resource may be, for example, one or more blocks of disk 118 on which data from database 120 is stored.

Lock management system 132 stores data structures that indicate the locks held by database servers 104, 114 and 124 on the resources shared by the database servers. If one database server requests a lock on a resource while another database server has a lock on the resource, then the distributed lock management system 132 must determine whether the requested lock is consistent with the granted lock. If the requested lock is not consistent with the granted lock, then the requester must wait until the database server holding the granted lock releases the granted lock.

According to one approach, lock management system 132 maintains one master resource object for every resource managed by lock management system 132, and includes one lock manager unit for each node that contains a database server. The master resource object for a particular resource stores, among other things, an indication of all locks that have been granted on or requested for the particular resource. The master resource object for each resource resides within only one of the lock manager units 106, 116 and 126.

The node on which a lock manager unit resides is referred to as the "master node" (or simply "master") of the resources whose master resource objects are managed by that lock manager unit. Thus, if the master resource object for a resource R1 is managed by lock manager unit 106, then node 102 is the master of resource R1.

In typical systems, a hash function is employed to select the particular node that acts as the master node for a given resource. For example, system 100 includes three nodes, and therefore may employ a hash function that produces three values: 0, 1 and 2. Each value is associated with one of the three nodes. The node that will serve as the master for a particular resource in system 100 is determined by applying the hash function to the name of the resource. All resources that have names that hash to 0 are mastered on node 102. All resources that have names that hash to 1 are mastered on node 112. All resources that have names that hash to 2 are mastered on node 122.

When a process on a node wishes to access a resource, a hash function is applied to the name of the resource to determine the master of the resource, and a lock request is sent to the master node for that resource. The lock manager on the master node for the resource controls the allocation and deallocation of locks for the associated resource.

While the hashing technique described above tends to distribute the resource mastering responsibility evenly among existing nodes, it has some significant drawbacks. For example, it is sometimes desirable to be able to select the exact node that will function as master node to a lock resource. For example, consider the situation when a particular lock resource is to be accessed exclusively by processes residing on node 102. In this situation, it would be inefficient to have the lock resource and the request queue for that resource located on any node in the network other than node 102. However, the relatively random distribution of lock resource management responsibilities that results from the hash function assignment technique makes it unlikely that resources will be mastered at the most efficient locations.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
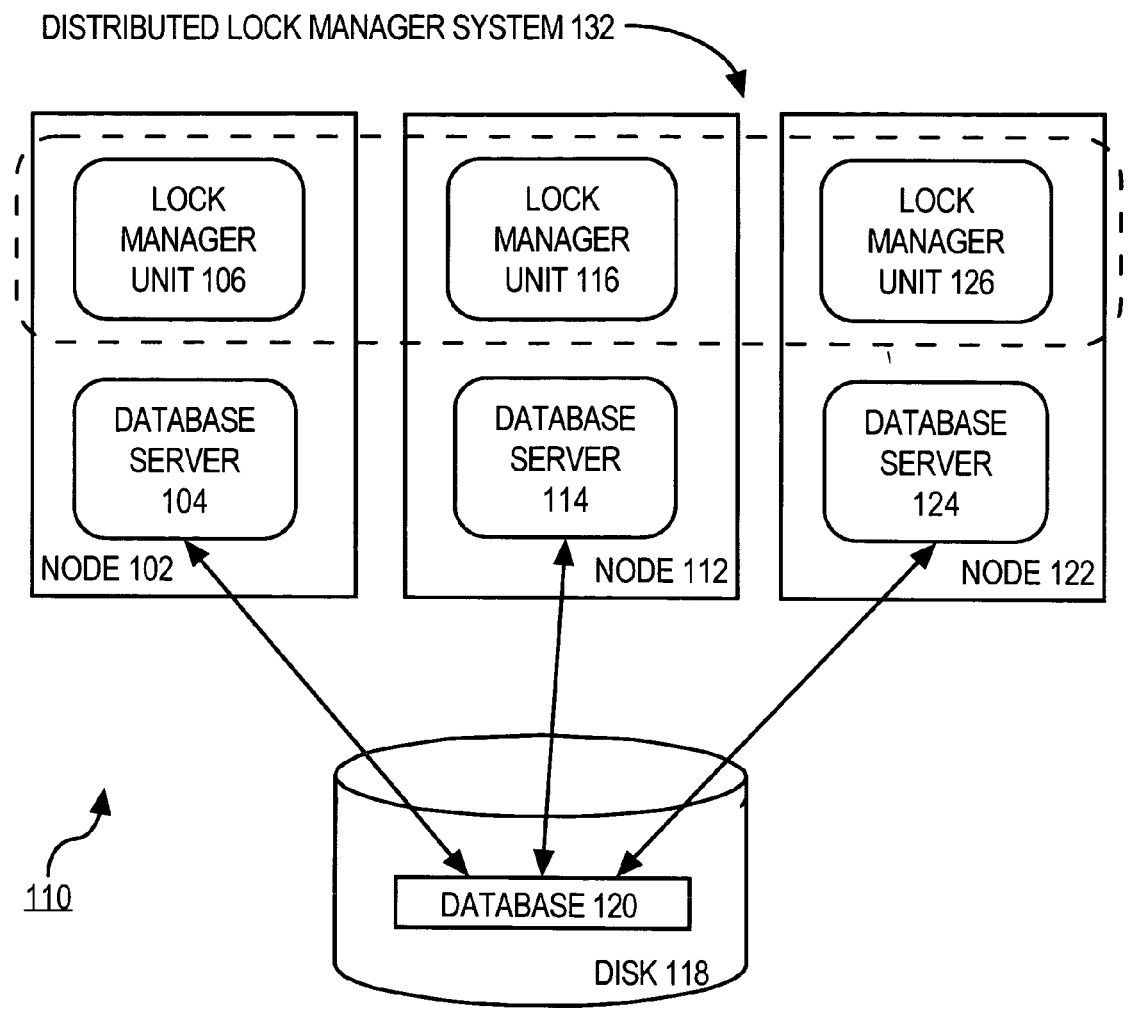
FIG. 1 is a block diagram of a computer system having a distributed lock manager.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Affinity-Based Mastery Assignments

Techniques are provided for establishing resource-to-master-node assignments based on the affinity between (1) nodes and (2) the objects to which the resources belong. In this context, an "object" may be any entity that includes resources that are protected by locks. The types of objects to which the techniques described herein may be applied may vary based on the type of system in which the techniques are used. For example, within a relational database system, "objects" could include tables, table partitions, segments, extents, indexes, Large Objects (LOBs), etc. Within a file system, "objects" could include files, sets of file system metadata, etc. Within a storage system, "objects" could include storage devices, disk sectors, etc.

The "affinity" between a node and an object refers to the degree of efficiency achieved by assigning the node to be the master of the resources that belong to the object. For example, a particular node that accesses a table much more frequently than any other node has a high degree of affinity to the table. Relative to that table, the degree of affinity for that particular node is high because, if that node is assigned to be the master of the resources within the table, a high number of inter-node lock-related communications would be avoided. On the other hand, a node that accesses a table much less frequently than other nodes has a low degree of affinity to the table, because assigning that node to be the master of the table would avoid few inter-node lock-related communications.

The avoidance of inter-node lock-related communications is merely one example of an efficiency factor that used to determine that affinity between objects and nodes. Other efficiency factors may be used instead of or in addition to inter-node traffic reduction.

Using Multiple Assignment Mechanisms

According to one embodiment, a lock manager system is provided that includes multiple distinct mechanisms for assigning resources to masters. Specifically, the lock manager system includes (1) one or more assignment mechanisms that do not take into account the affinity between nodes and objects ("affinity-independent assignment mechanisms"), and (2) one or more assignment mechanisms that do take into account the affinity between nodes and objects ("affinity-based assignment mechanisms").

At any given time, the assignment of any given resource to a master is governed by only one of the multiple assignment mechanisms employed by the system. Various techniques shall be described hereafter for determining which assignment mechanism to use with which resources.

Transitioning Between Assignment Mechanisms

According to one embodiment, the lock manager system initially makes resource-to-master-node assignments using the affinity-independent mechanism, which does not take into account affinity considerations. The affinity-independent mechanism may use any one of a variety of techniques for establishing the resource-to-master-node assignments, including the technique establishes the assignments by hashing the names of the resources to nodes.

While the system operates based on the resource-to-master-node assignments made by the affinity-independent mechanism, a monitoring mechanism is used to identify situations in which the affinity between an object and a node satisfies certain "affinity start conditions". When the system detects that the affinity start conditions are satisfied between an object and a node, the resources of the object cease to be mastered based on the assignments made by the affinity-independent mechanism. Instead, an affinity relationship is automatically established between the object and the node to which the object has affinity. Once an affinity relationship is established between a node and an object, the system uses the affinity-based assignment mechanism to make the node the master of all resources that belong to the object. For all resources that belong to the object, the object-to-master assignment that results from the affinity relationship overrides the assignments made by the affinity-independent mechanism.

According to one embodiment, the monitoring mechanism also identifies situations in which "affinity end conditions" are satisfied. When affinity end conditions are satisfied, the affinity relationship between a node and an object is dissolved, and the resources that belong to the object are remastered. The manner in which the resources are remastered may depend on the affinity end conditions that were satisfied. For example, if the affinity end conditions were that the node had not accessed the object for more than a threshold amount of time, then the resources may be remastered across all of the nodes using the affinity-independent assignment mechanism. On the other hand, if the affinity end conditions were that another node had satisfied the affinity start conditions for the object, then the resources may be remastered at the other node by establishing a new affinity relationship between the object and the other node.

Figure 2:
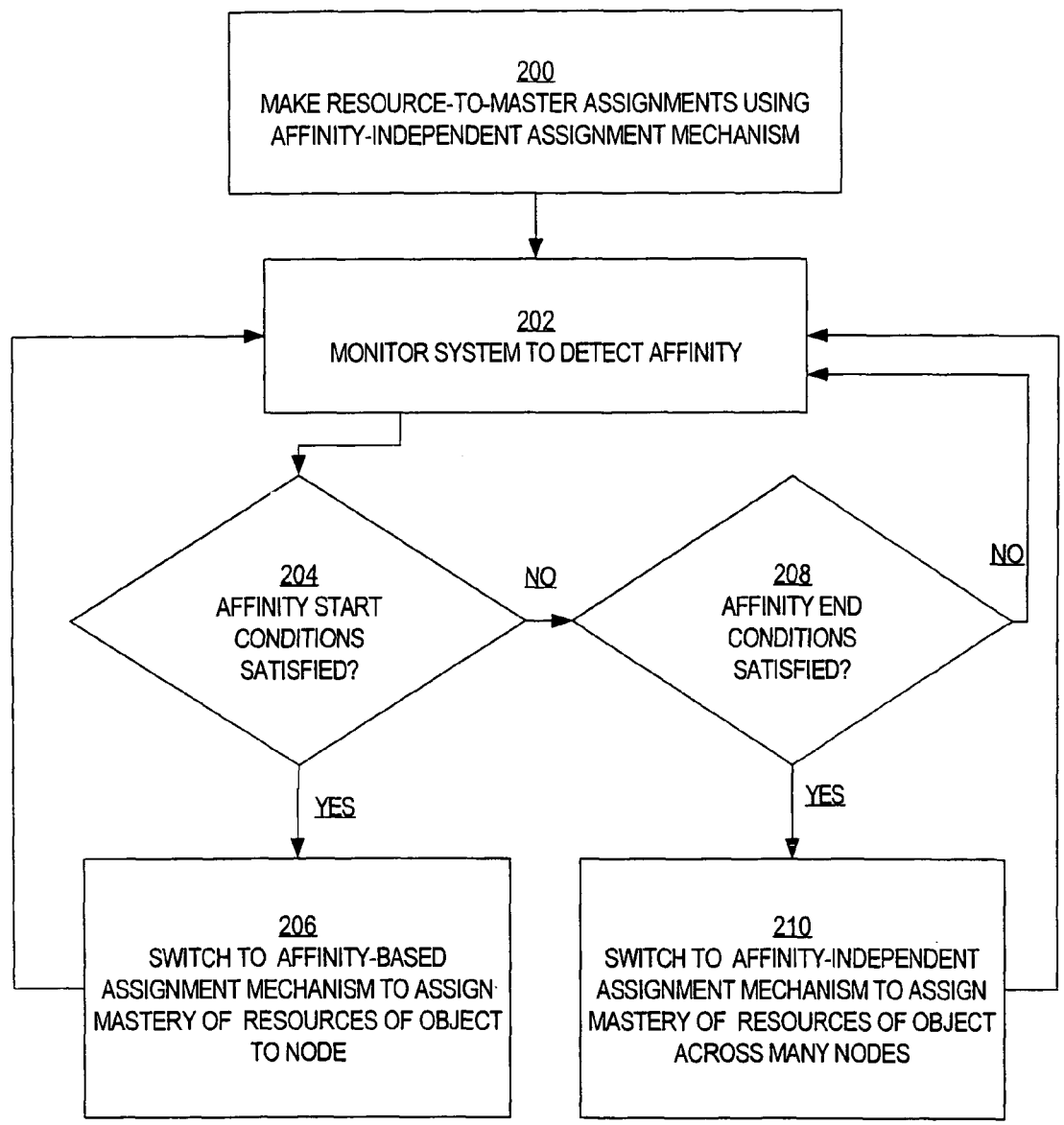
FIG. 2 is a flowchart of a technique for dynamically remastering the resources that belong to objects based on the degree of affinity between nodes and the objects to which the resources belong.

FIG. 2 is a flowchart that illustrates how, according to one embodiment, a system with an affinity-independent assignment mechanism and an affinity-based assignment mechanism may switch between the two mechanism based on affinity (or lack of affinity) detected while monitoring the system.

At step 200, the system makes resource-to-master assignments using the affinity-independent assignment mechanism. At step 202, the system is monitored to detect the affinity between nodes and objects. At step 204, it is determined whether affinity start conditions have been satisfied. If affinity start conditions have been satisfied relative to an object and a node, then at step 206, the system switches to the affinity-based assignment mechanism, and assigns all resources that belong to the object to the node.

At step 208, the system determines whether affinity end conditions have been satisfied relative to an object and a node. If affinity end conditions have been satisfied relative to an object and a node, then at step 210 the system switches back to the affinity-independent assignment mechanism to reassign master of the resources that belong to the object. Typically, switching to the affinity-independent assignment mechanism will result in remastering the resources of the object across many nodes.

The system continues to be monitored (step 202) while the appropriate switches are made at steps 206 and 208. Thus, affinity relationships may be formed, broken, and reformed over time, based on the changing conditions within the system.

Detecting Affinity Based on Open Locks

A variety of techniques may be used to determine the affinity between objects and nodes. According to one embodiment, the monitoring mechanism determines the degree of affinity between nodes and an object based, at least in part, on how many locks the nodes open on resources that belong to the object. For example, an affinity start condition may be that a particular node opens more locks on resources of an object than are opened by all other nodes combined. The monitoring mechanism may then monitor how many locks are opened by each node during a monitoring period. If, during the monitoring period, a particular node satisfies the affinity start condition, then an affinity relationship is established between the object and the node.

Detecting Affinity Based on a Cost-Based Analysis of a Command

According to one embodiment, the affinity between objects and nodes is based, at least in part, on a cost-based analysis performed by a command execution optimizer within a database server. Specifically, when a database server receives a command from a database application, a command execution optimizer within the database server analyzes the command and determines an execution plan for performing the operations requested by the command. The command may be, but is not limited to, a SQL query, insert, delete, update statement or a procedure. During the analysis of the command, the command execution optimizer may perform a cost-based analysis that takes into account the cost of remastering the resources of the objects against which the command is to be executed. Based on the results of the cost-based analysis, the lock manager system would establish affinity relationships in situations in which execution of the command will result in heavy access to a particular object.

The optimizer may, for example, determine that (1) the cost of remastering the resources that belong to the object to the node that executes the command, is less than (2) the cost of executing the command without remastering the resources. Based on this determination by the optimizer, the lock manager system may determine that there is affinity between the object and the node that is assigned to execute the command, and cause the resources of the object to be remastered to that node prior to executing the command. Under these circumstances, the lock manager system may be configured to automatically dissolve the affinity relationship between the node and the object after the command has been executed.

Detecting Affinity Based on the Type of Requested Operations

As another example, during the analysis of the command, the command execution optimizer may identify queries that involve certain types of operations that, by their very nature, will result in heavy access to a particular object. For example, any node that executes a command that creates and populates a new table will typically access the new table heavily. Therefore, optimizer may be configured to identify queries that involve the creation of new objects.

When a node executes a command that has been thus identified, the lock manager system may establish an affinity relationship between the new table and the node that is assigned to execute the command, and cause the resources of the new table to be initially be mastered by the node that is executing the command. Under these circumstances, the lock manager system may be configured to automatically dissolve the affinity relationship between the node and the object after the command has been executed.

Knowledge-Based Affinty

According to one embodiment, the system may establish an affinity relationship between an object and a node automatically based on knowledge that the system has relating to the object. For example, in many multi-node systems, certain sets of metadata, such as undo/redo logs, are used mainly by one node. Based on the knowledge that an object is going to be used to store such metadata for a particular node, the system may automatically establish an affinity relationship between the object and the node whose metadata is going to be stored in the object.

Knowing that an object is going to be used as an undo segment is merely one example of knowledge that may result in the automatic establishment of affinity relationships. The technique of automatically establishing affinity relationships based on knowledge about an object is not limited to any particular types of knowledge, nor any particular types of objects. For example, the system may automatically establish affinity relationships based on the nature of objects, knowledge of how the objects will be used, and relationships between objects. For example, if an affinity relationship has been established between a node and a particular table, then the system may automatically establish an affinity relationship between that node and all indexes built on the particular table.

User-Specified Affinity Relationships

According to one embodiment, a user may establish an affinity relationship between an object and a node automatically based on knowledge that the user has relating to the object. Unlike the knowledge-based affinity techniques described above, the system may have any awareness of the factors that motivate the user to specify an affinity relationship.

In response to receiving input from a user that specifies an affinity relationship between a node and an object, the system stores metadata that establishes the affinity relationship, and uses the affinity-based assignment mechanism to cause the resources that belong to the object to be mastered at the specified node.

Lock Management of Resources in Affinity Relationships

According to one embodiment, lock management is performed differently for resources that belong to objects involved in affinity relationships than for resources that are mastered based on the affinity-independent assignment mechanism. In one embodiment, lock management for resources that belong to objects involved in affinity relationships is performed using local locks for global synchronization. Examples of such techniques that use local locks for global synchronization are described in U.S. patent application Ser. No. 10/435,229, entitled "Using Local Locks for Global Synchronization in Multi-Node Systems", filed by Juan Loaiza, Sashikanth Chandrasekaran, Neil Macnaughton on May 9, 2003 (the "Local Lock Application"), the entire contents of which are incorporated herein by reference.

In general, to access a shared resource that does not belong to an object in an affinity relationship, a process acquires a global lock on the resource (regardless of where the process is located). In contrast, for resources that belong to objects involved in affinity relationships, local processes accessing a shared resource mastered by the local node may only need a local lock to access to the shared resources.

The determination of whether a request for a lock may be honored with only a local lock depends on a variety of factors and conditions. One factor is whether the resource requested by a process is mastered by a node other than the local node for the process. If the resource is mastered by a node other than the node that is local to the process, then the request cannot be honored with only a local lock and a global lock will have to be obtained.

Another factor is whether the resource requested by a process is mastered by the local node of the process and no global lock is currently held by another node (i.e. no process owns a global lock on the resource or only local processes of the master own a local lock on the resource). If the resource requested by a process is mastered by the local node of the process and no global lock is currently held by another node, then the request can be honored with only a local lock. Cases where only local locking is used are described in greater detail in the Local Lock Application. In such cases, the acquisition of a global lock is foregone or deferred until a global lock is actually needed. In many cases, a global lock may not be needed.

Reducing the Overhead of the Monitoring Mechanism

In some of the embodiments described above, a monitoring mechanism is used to dynamically (1) gather information about the operation conditions of the system, (2) determine affinity between objects and nodes based on that information, and (3) report the affinity relationships to the nodes of the system. It is important that all nodes are kept up-to-date relative to the affinity relationships, to avoid situations where one node tries to find the master of a resource using the affinity-independent assignment mechanism, while a different node tries to find the master of the same resource using the affinity-based assignment mechanism.

The form of such a monitoring mechanism may vary from implementation to implementation based, for example, on the specific statistics that are used to determine affinity. Regardless of the specific statistics used to determine affinity, the overhead associated with monitoring those statistics should be kept to a minimum. For example, it is desirable to minimize the amount of inter-node traffic generated by the monitoring mechanism. The amount of such traffic may be significant, for example, if all nodes are required to report their statistics to a central mechanism, and the central mechanism is required to report the affinity relationships to all nodes.

Decentralized Monitoring Mechanism

According to one embodiment, the traffic generated by the monitoring mechanism is minimized through the use of decentralized monitoring technique in which nodes stay up-to-date with each other by piggy-backing monitored statistics on lock-related messages. For example, consider a system that determines affinity to an object based on which nodes are opening locks on the object. According to one embodiment, each node in the system:

(1) maintains a "list-of-opens" that indicates how many locks the node has opened for each object. The list-of-opens is per object that is accessed per node. So the list-of-opens is conceptually (and may be implemented as) an N*M 2-dimensional array, where N is the number of nodes and M is the number of objects being accessed;

(2) when sending to another node a lock-related message that involves a particular resource, piggybacks onto the message the count of how many locks the node has opened on the object to which the resource belongs;

(3) when receiving from another node a lock-related message that involves a particular resource, updates its list-of-opens to reflect the count of how many locks the sending node has opened on the object to which the resource belongs.

By performing steps (2) and (3), each node is able to update its list-of-opens to reflect how many locks each of the other nodes in the cluster have opened on each object. A node can determine how many locks the other nodes have opened, because the messages sent when opening a lock also contain the number of locks that the node sending the message has opened.

For example, assume that a node N1 needs to use resources R1, R2 and R3 of object O1. Assume that resources R1, R2 and R3 are mastered at nodes N1, N2 and N3, respectively. Under these circumstances, the following sequence of events may occur:

N1 opens a lock on R1, and updates its list-of-opens that indicate how many locks it has opened on O1

N1 sends N2 a first message that requests a lock on R2; within the first message, N1 piggybacks information that indicates how many locks N1 has opened on O1

N1 updates its list-of-opens that indicate how many locks it has opened on O1

N2 receives the first message from N1 and extracts from the first message the information that indicates how many locks N1 has opened on O1

N2 updates its list-of-opens to reflect how many locks N1 has opened on O1

N2 sends a second message to N1 that grants to N1 a lock on R2; within the second message, N2 piggybacks information that indicates how many locks N2 has opened on O1

N1 receives the second message from N2 and extracts from the second message the information that indicates how many locks N2 has opened on O1

N1 updates its list-of-opens to reflect how many locks N2 has opened on O1

N1 sends N3 a third message that requests a lock on R3; within the third message, N1 piggybacks information that indicates how many locks N1 has opened on O1

N1 updates its list-of-opens that indicate how many locks it has opened on O1

N3 receives the third message from N1 and extracts from the third message the information that indicates how many locks N1 has opened on O1

N3 updates its list-of-opens to reflect how many locks N1 has opened on O1

N3 sends a fourth message to N1 that grants to N1 a lock on R3; within the fourth message, N3 piggybacks information that indicates how many locks N3 has opened on O1

N1 receives the fourth message from N3 and extracts from the fourth message the information that indicates how many locks N3 has opened on O1

N1 updates its list-of-opens to reflect how many locks N3 has opened on O1

After this sequence of interactions, N1 knows how many locks have been opened on O1 by N1, N2, and N3. Likewise, each of N2 and N3 also knows how many locks have been opened on O1 by themselves and by N1.

As is evident by the preceding example, if a node is opening lots of locks for an object, it will quickly learn how many locks all the other nodes have opened on the same object, because it will get locks granted by the other nodes, and these messages will contain the number of locks the other nodes have opened. If a node is not opening any locks for an object, it will still find out how many locks the other instances have opened, because it will receive messages asking it to grant locks for the object.

Monitoring Periods

According to one embodiment, affinity information is gathered, and affinity determinations are made, on a periodic basis. A period of time during which affinity information is gathered is referred to herein as a "monitoring period". Monitoring periods may be of fixed or variable duration.

According to one embodiment, a decentralized monitoring system is used for a fixed period of time to generate list-of-opens at each node. After the fixed period of time, each node examines its list-of-opens for each object, and if it finds that it has opened much more locks for the object than all the other nodes, it becomes the master for the object.

Conversely, a node that belongs to an affinity relationship with an object may dissolve affinity if, during a monitoring period, another node starts to open lots of locks for the object.

Once an object is in an affinity relationship, the only node which has a global view of the number of locks that all nodes are opening is the node that has affinity for the object. For example, if node N1 is in an affinity relationship with object O1, then N1 will be the master of all resources that belong to O1. Consequently, N1 will be the only node receiving requests for locks on the resources belong to O1. Because all lock requests that involve resources that belong to O1 will be received by N1, N1 will be able to maintain an accurate and complete list-of-opens for O1. Other nodes, on the other hand, will only know (1) how many locks they have personally opened on O1, and (2) how many locks N1 has opened on O1.

Because the node involved in an affinity relationship with an object is the only node with a complete list-of-opens for the object, only this node can dissolve affinity for the object. Thus, if an affinity relationship has been established between N1 and O1, then only N1 is allowed to dissolve the affinity relationship with O1. According to one embodiment, at the end of each monitoring period, each node that is involved in an affinity relationship examines its list-of-opens and, if other nodes are opening many locks on the object, it dissolves the affinity.

Aging Out Old Affinity Information

For efficient operation within the system, the affinity relationships between nodes and objects should reflect the current affinity between nodes and objects, rather than affinity that may have existed in the past. For example, if N1 opened one million locks on resources of an object in the distant past, an affinity relationship may have been established between N1 and the object. However, many days may have passed during which N1 has opened no locks on resources of the object. Instead, a different node N2 may be the only node that is currently opening locks on resources of the object. Under these circumstances, it is inefficient to continue the affinity relationship between the object and N1. However, as long as the list-of-opens continues to reflect the one million lock opens, the affinity between N1 and the object may never get dissolved.

To avoid inefficiencies that result from old affinity data, techniques are provided for aging out old affinity information, so that affinity decisions are based on relatively current conditions. One such technique involves resetting to zero all of the entries in each list-of-opens at the start of each new monitoring period. Thus, the affinity decision made at the end of a monitoring period will reflect only the activity that occurred during the monitoring period.

Alternatively, each node may maintain a separate set of count values for each of the N most recent monitoring periods. For example, assume that N is 2. At the start of a third monitoring period, the values obtained during the first monitoring period would be cleared. Similarly, at the start of a fourth monitoring period, the values obtained during the second monitoring period would be cleared. By maintaining the list-of-opens in this manner, the affinity decisions will always be based on the activity during the N most recent monitoring periods.

Updating Lists-of-Opens

As mentioned above, each node maintains a list-of-opens, and updates values in the list based on its own lock operations, and based on lock open information received in lock-related messages exchanged with other nodes. According to one embodiment, the affinity information that is extracted from a lock-related message for a resource indicates the actual number of locks opened, by the node that sent the message, on the object that contains the resource. Because the values are the actual count (and not simply a delta from a previous count), the receiving node may store the values into the appropriate entry of its list-of-opens without regard to the value that currently exists in that entry.

If an attempt to store a value into an entry of the list-of-opens fails, then the prior value in the entry will usually be a close approximation of the correct value. Further, if a subsequent attempt to store another value in the entry succeeds, then the entry will reflect the correct value. In other words, any error that results from a failed attempt to write a value into an entry of a list-of-opens table is automatically corrected by a later-performed successful write operation into the same entry.

Because write errors do not have significant consequences, one embodiment of the invention does not use latches to serialize access to the list-of-opens. Thus, if a node attempts to write two different values into the same entry at the same time, it is possible that the later value is written first, and then overwritten by the earlier value. While this results in a temporary error in the entry, the error is typically so small that it will not have an effect on the affinity determinations made by the node. Further, the error is eliminated the next time a value is successfully written into that entry.

Decentralized Affinity Determinations

According to one embodiment, each node in a system with a decentralized monitoring mechanism makes affinity decisions based on information in its local list-of-opens. Specifically, if the information in a node's list-of-opens indicates that the affinity start conditions have been satisfied between the node and an object, then the node establishes an affinity relationship with the object. Conversely, if the information in a node's list-of-opens indicates that the affinity end conditions have been satisfied between the node and an object that is in an affinity relationship to the node, then the node dissolves the affinity relationship with the object. Further, if the information in a node's local list-of-opens indicates that another node has satisfied affinity start conditions relative to an object with which the node currently has an affinity relationship, then the node transfers the affinity relationship of the particular object to the other node.

It should be noted that, even though the information in each list-of-opens may be consistent with all other lists-of-opens, it is not necessarily identical. Specifically, for any given object, each node only knows the open lock count for (1) other nodes that requested, from the given node, a lock on a resource that belongs to object, or (2) other nodes to whom the given node requested for a lock on a resource that belongs to the particular object. Consequently, nodes that rarely access a resource may have incomplete information about the open locks other nodes have on the resource. However, this does not result in erroneous affinity determinations, because the nodes that have high affinity to an object will have been opening many locks on the object, and will therefore have the most complete information about the number of locks other nodes have opened on the object.

Syncronizing Affinity Determinations

Because each node makes affinity determinations based on its local list-of-opens, it is important to ensure that the information that each node reads from its list-of-opens is consistent with the information that all other nodes read from their list-of-opens. Inconsistent information may lead to inconsistent affinity decisions. For example, inconsistent information may lead two nodes to decide that they have affinity relative to the same object.

For objects that are already in an affinity relationship, inconsistent affinity determinations are avoided by allowing only the node that is in the affinity relationship to determine when to dissolve the affinity relationship. However, this rule does not prevent inconsistent determinations relative to objects that are not already in an affinity relationship.

According to one embodiment, inconsistent determinations relating to objects that are not already involved in affinity relationships are avoided by synchronizing the affinity determinations made by the nodes. During a synchronized monitoring period, all nodes start and end the monitoring period at the same time. If (1) the information maintained by the nodes is consistent at the start of a synchronized monitoring period, and (2) all nodes make affinity determinations based on the state of the information at the end of a synchronized monitoring period, then the information upon which all nodes are making the affinity determinations should be consistent. If the information upon which all nodes are making the affinity determinations is consistent, then the affinity determinations made by the nodes will be consistent.

The actual mechanism used to synchronize the various nodes in a multiple-node system may vary from implementation to implementation. For example, a system that has a global clock may simply synchronize based on the value of the global clock. Alternatively, systems that do not have a global clock may use protocols, such as the Network Time Protocol (NTP) to synchronize their monitoring periods and affinity determinations.

Yet another mechanism for synchronizing the monitoring periods and affinity determinations of the various nodes involves having designated "coordinator node" send messages to all of the other nodes to tell the nodes when to start and end monitoring periods. The amount of traffic generated by the use of a coordinator node is minimal relative to the amount of traffic that is avoided by piggy-backing the affinity information on the lock-related messages.

Affinty Measures

In many of the examples given above, affinity to an object is determined based on the number of locks that are opened, by each node, on resources that belong to the object. However, the count of lock opens is merely one example of the type of information that may be used in affinity determinations. For example, in one alternative embodiment, affinity determinations may be based on the rate at which nodes open locks on objects. In such an embodiment, each node may keep track of the frequency with which it is accessing resources that belong to each object. The frequency information may be piggybacked on lock-related messages, and stored in the list-of-opens as described above.

Alternatively, a system may piggyback count information on the messages, but still make affinity decisions based on access frequency. For example, each node may maintain two count values for each node for each object. By dividing the difference between the two count values by the amount of time that lapsed between the two count values, a node is able to determine the frequency of access.

A system that makes affinity decisions based on access frequency might make different affinity decisions than a system that simply uses lock open counts. For example, even though a node N1 previously opened significantly more locks on an object O1 than another node N2, N1 may now be opening locks on O1 much less frequently than N2. In an embodiment that stores lock frequency information within the list-of-opens, affinity between O1 and N2 may be established under these circumstances.

Another benefit of using frequency information is that it may not be necessary to periodically clear the values in the list-of-opens. In addition, it may not be necessary to precisely synchronize the monitoring periods used by the nodes.

Systems may make affinity decisions based on multiple affinity factors. For example, a system may use the piggy-backing technique described above to maintain both absolute count and access frequency information. Such factors may be combined in any number of ways to determine the overall affinity between nodes and objects. For example, in one embodiment, the start affinity rule may be: a node has affinity to an object if the lock open count for the node during a five minute monitoring period is greater than the sum of the lock open count for all other nodes on the same object, unless the access frequency of that node to that object during the most recent one minute window is below a certain threshold.

Hardware Overview

Figure 3:
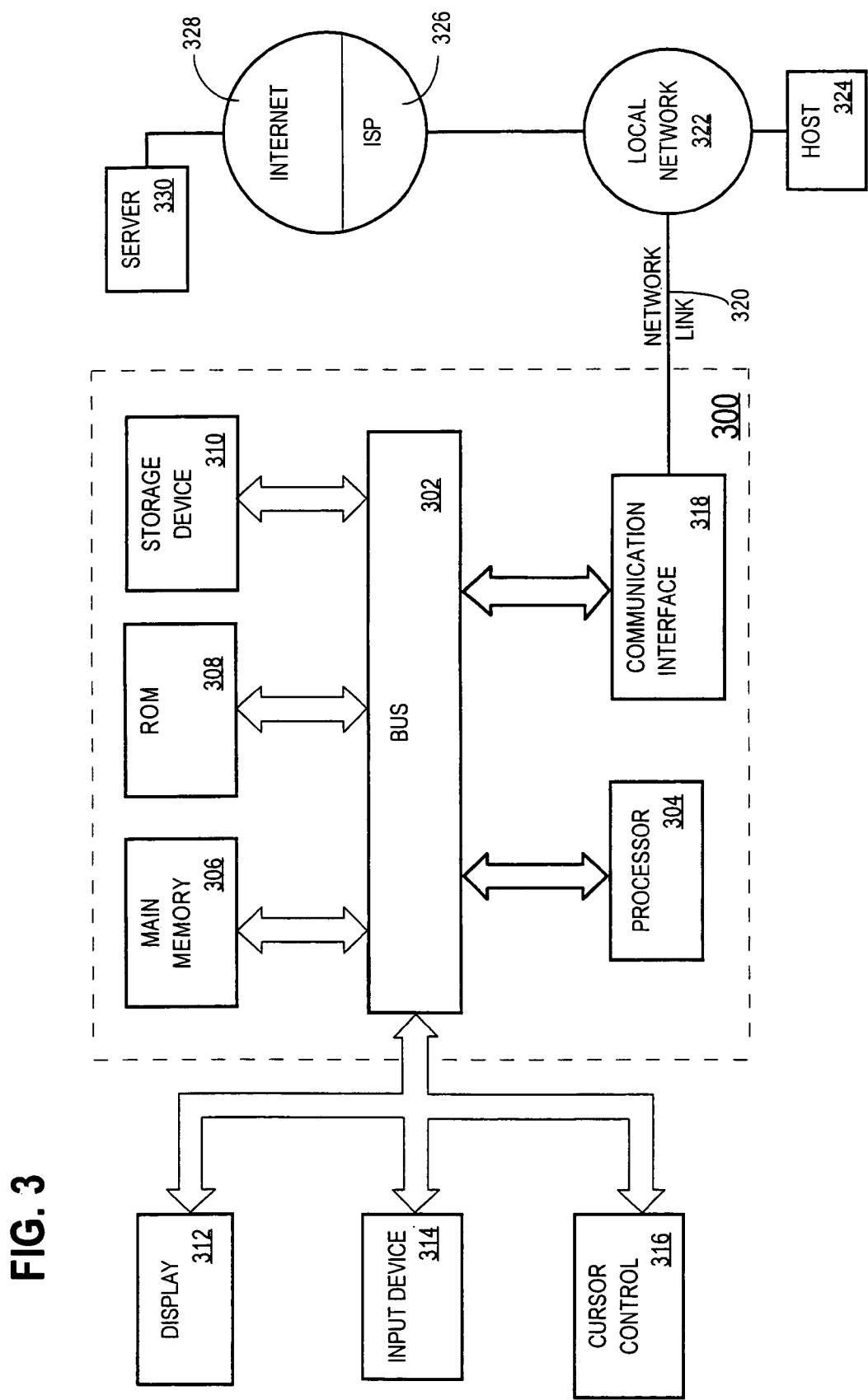
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for communicating affinity information in a system that includes a plurality of nodes, comprising:
   causing each node of the plurality of nodes to maintain a set of affinity information by performing the steps of storing, within the set of affinity information, affinity information relating to the node's own use of each object of a plurality of objects;

when the node sends a particular type of message to another node, piggy-backing on the message affinity information relating to the node's use of a particular object; and when the node receives a particular type of message from another node, reading from the message piggy-backed affinity information relating to the other node's use of a particular object, and updating the set of affinity information based on the affinity information that was piggy-backed on the message from the other node;

wherein the step of piggy-backing on the message affinity information relating to the node's use of a particular object includes:

when the node sends a lock request for a resource that belongs to a particular object, including in the lock request affinity information relating to the node's use of the particular object;

wherein the set of affinity information maintained by each node of the plurality of nodes separately maintains (a) information about the node's own use of each object of a plurality of objects, and (b) information about at least one other node's use of each object of the plurality of objects;

wherein the method is performed by one or more computing devices.

2. The method of claim 1 wherein:

the step of reading from the message piggy-backed affinity information relating to the other node's use of a particular object includes: when the node receives a lock request, from another node, for a resource that belongs to a particular object, reading from the lock request affinity information relating to the other node's use of the particular object, and updating the set of affinity information based on the affinity information read from the received lock request.

3. The method of claim 1 wherein the set of affinity information maintained by each node includes information about how many locks other nodes within the system have opened on each object of the plurality of objects.

4. The method of claim 1 further comprising each node determining, based on the set of affinity information maintained by the node, whether affinity start conditions have been satisfied between the node and any of the plurality of objects.

5. The method of claim 4 further comprising, in response to a node determining that affinity start conditions have been satisfied between the node and a particular object, establishing an affinity relationship between the node and the particular object.

6. The method of claim 5 further comprising, in response to establishing an affinity relationship between the node and the particular object, remastering at the node all resources that belong to the object.

7. The method of claim 1 further comprising each node determining, based on the set of affinity information maintained by the node, whether affinity end conditions have been satisfied between the node and any of the plurality of objects with which the node currently has an affinity relationship.

8. The method of claim 7 further comprising, in response to a node determining that affinity end conditions have been satisfied between the node and a particular object, dissolving the affinity relationship between the node and the particular object.

9. The method of claim 8 further comprising, in response to dissolving the affinity relationship between the node and the particular object, remastering the resources that belong to the object using an affinity independent assignment mechanism.

10. The method of claim 1 further comprising:

each node determining, based on the set of affinity information maintained by the node, whether another node has satisfied affinity start conditions relative to an object with which the node currently has an affinity relationship; and in response to a node determining that another node has satisfied affinity start conditions relative to an object with which the node currently has an affinity relationship, the node transferring the affinity relationship of the particular object to the other node.

11. The method of claim 1 further comprising each node aging out older affinity information from its set of affinity information.

12. The method of claim 11 wherein the step of aging out older affinity information is performed by periodically clearing at least some of the values in the set of affinity information.

13. The method of claim 12 wherein:

the set of affinity information includes values gathered during each of a plurality of monitoring periods; and step of periodically clearing is performed by clearing the values that were gathered during the oldest monitoring period that is currently reflected in the set of affinity information.

14. The method of claim 1 wherein the set of affinity information maintained by each node includes information about the frequency at which other nodes within the system are accessing each object of the plurality of objects.

15. A non-transitory computer-readable storage medium storing one or more sequences of instructions which, when executed by one or more processors, causes the one or more processors to perform the method recited in claim 1.

16. A non-transitory computer-readable storage medium storing one or more sequences of instructions which, when executed by one or more processors, causes the one or more processors to perform the method recited in claim 2.

17. A non-transitory computer-readable storage medium storing one or more sequences of instructions which, when executed by one or more processors, causes the one or more processors to perform the method recited in claim 3.

18. A non-transitory computer-readable storage medium storing one or more sequences of instructions which, when executed by one or more processors, causes the one or more processors to perform the method recited in claim 4.

19. A non-transitory computer-readable storage medium storing one or more sequences of instructions which, when executed by one or more processors, causes the one or more processors to perform the method recited in claim 5.

20. A non-transitory computer-readable storage medium storing one or more sequences of instructions which, when executed by one or more processors, causes the one or more processors to perform the method recited in claim 6.

21. A non-transitory computer-readable storage medium storing one or more sequences of instructions which, when executed by one or more processors, causes the one or more processors to perform the method recited in claim 7.

22. A non-transitory computer-readable storage medium storing one or more sequences of instructions which, when executed by one or more processors, causes the one or more processors to perform the method recited in claim 8.

23. A non-transitory computer-readable storage medium storing one or more sequences of instructions which, when executed by one or more processors, causes the one or more processors to perform the method recited in claim 9.

24. A non-transitory computer-readable storage medium storing one or more sequences of instructions which, when executed by one or more processors, causes the one or more processors to perform the method recited in claim 10.

25. A non-transitory computer-readable storage medium storing one or more sequences of instructions which, when executed by one or more processors, causes the one or more processors to perform the method recited in claim 11.

26. A non-transitory computer-readable storage medium storing one or more sequences of instructions which, when executed by one or more processors, causes the one or more processors to perform the method recited in claim 12.

27. A non-transitory computer-readable storage medium storing one or more sequences of instructions which, when executed by one or more processors, causes the one or more processors to perform the method recited in claim 13.

28. A non-transitory computer-readable storage medium storing one or more sequences of instructions which, when executed by one or more processors, causes the one or more processors to perform the method recited in claim 14.

* * * * *